United States Patent
Ba et al.

(10) Patent No.: US 11,486,691 B2
(45) Date of Patent: Nov. 1, 2022

(54) MUD MOTOR CONTROL USING ECCENTRICITY MEASUREMENT

(71) Applicant: Schlumberger Technology Corporation, Sugar Land, TX (US)

(72) Inventors: Samba Ba, Katy, TX (US); Maxim Pushkarev, Edmonton (CA); Anton Kolyshkin, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 144 days.

(21) Appl. No.: 16/383,285

(22) Filed: Apr. 12, 2019

(65) Prior Publication Data

US 2019/0316895 A1 Oct. 17, 2019

Related U.S. Application Data

(60) Provisional application No. 62/656,382, filed on Apr. 12, 2018.

(51) Int. Cl.
| | |
|---|---|
| *E21B 3/02* | (2006.01) |
| *G01B 7/312* | (2006.01) |
| *E21B 4/02* | (2006.01) |
| *E21B 41/00* | (2006.01) |
| *H02K 29/06* | (2006.01) |

(52) U.S. Cl.
CPC ............... *G01B 7/312* (2013.01); *E21B 3/02* (2013.01); *E21B 4/02* (2013.01); *E21B 41/0085* (2013.01); *H02K 29/06* (2013.01)

(58) Field of Classification Search
CPC .............. G01B 7/312; E21B 3/02; E21B 4/02
USPC .......................................................... 73/462
See application file for complete search history.

(56) References Cited

U.S. PATENT DOCUMENTS

| | | | | |
|---|---|---|---|---|
| 2003/0010534 A1* | 1/2003 | Chen | ....................... | E21B 47/01 175/75 |
| 2009/0095528 A1* | 4/2009 | Hay | ....................... | F04C 14/06 175/26 |
| 2010/0163306 A1* | 7/2010 | Pabon | ....................... | E21B 4/02 703/2 |
| 2015/0167466 A1* | 6/2015 | Teodorescu | ............... | G01P 3/44 73/152.01 |
| 2015/0354280 A1* | 12/2015 | Downton | ................ | E21B 4/003 175/107 |
| 2018/0266181 A1* | 9/2018 | Gawski | ................... | F03B 13/02 |

* cited by examiner

*Primary Examiner* — John Fitzgerald
*Assistant Examiner* — Rodney T Frank

(57) ABSTRACT

A method, system, and computer-readable medium related to control of mud motors in drilling systems, of which the method includes measuring an eccentricity of rotation of a rotor in a stator of a mud motor using a rotor-position sensor, determining a torque of the mud motor based in part on the eccentricity, and selecting a fluid flow rate, a pressure, or both of fluid delivered downhole, through the mud motor, based in part on the determined torque.

20 Claims, 9 Drawing Sheets

MUD MOTOR CONTROL USING ECCENTRICITY MEASUREMENT

CROSS-REFERENCE TO RELATED APPLICATIONS

This application claims priority to U.S. Provisional Patent Application having Ser. No. 62/656,382, which was filed on Apr. 12, 2018 and is incorporated herein by reference in its entirety.

BACKGROUND

Mud motors are used to convert energy stored in drilling fluid into mechanical, rotational energy. Mud motors are often used in connection with a bottom hole assembly. The rotational energy can be converted to electrical energy, so as to power downhole devices and/or can be used directly to rotate drilling equipment.

It may be useful to know the torque that is applied by the mud motor. This may allow for efficiently providing pressure thereto, while avoiding stall events. In a stall event, the rotor of the mud motor ceases movement, which can be damaging to the downhole components. However, direct torque measurements are difficult to take in the downhole environment.

SUMMARY

Embodiments of the disclosure may provide a method including measuring an eccentricity of rotation of a rotor in a stator of a mud motor using a rotor-position sensor, determining a torque of the mud motor based in part on the eccentricity, and selecting a fluid flow rate, a pressure, or both of fluid delivered downhole, through the mud motor, based in part on the determined torque.

Embodiments of the disclosure may also provide a system including a mud motor having a rotor, a stator, and a rotor-position sensor. The rotor is configured to rotate eccentrically with respect to the stator, and the rotor-position sensor is configured to measure an eccentricity of the rotation of the rotor with respect to the stator. The system also includes a pump configured to deliver fluid to the mud motor, the fluid delivered to the mud motor causing the rotor to rotate, and a controller in communication with the pump and the rotor-position sensor. The controller is configured to receive measurements from the rotor-position sensor, the measurements representing the eccentricity, and to determine a torque of the mud motor based on the eccentricity.

Embodiments of the disclosure may further provide a non-transitory, computer-readable medium storing instructions that, when executed by a process of a computing system, cause the computing system to perform operations. The operations include determining an eccentricity of rotation of a rotor in a stator of a mud motor based on measurements received from a rotor-position sensor, determining a torque of the mud motor based on the eccentricity, and selecting a fluid flow rate and/or pressure downhole, through the mud motor, based on the determined torque.

The foregoing summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1:
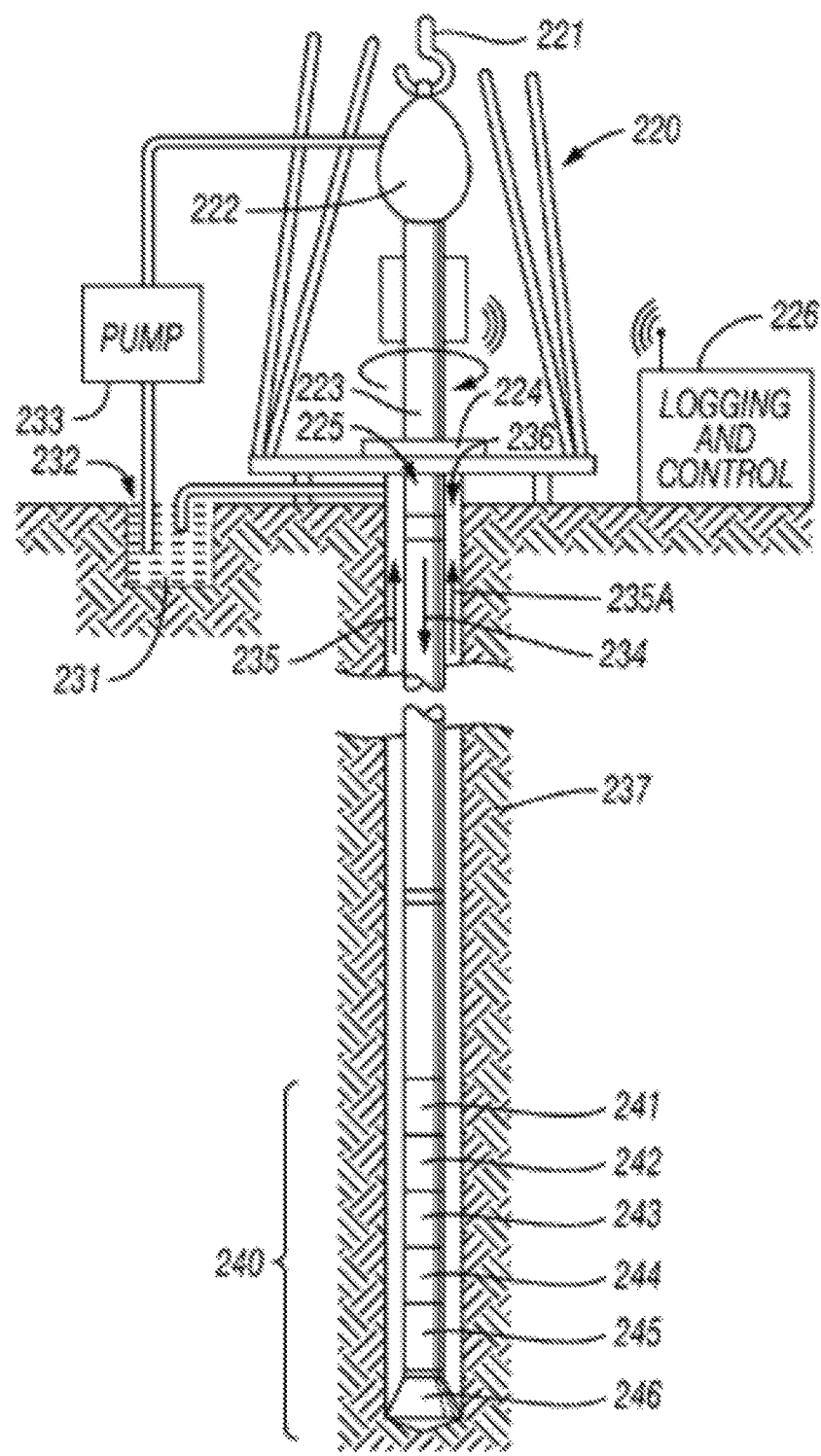
FIG. 1 illustrates an example of a wellsite system, according to an embodiment.

FIG. 1 illustrates a wellsite system in which data to be used according to examples of the present disclosure may be used. The wellsite can be onshore or offshore. In this example system, a borehole is formed in subsurface formations by rotary drilling in a manner that is well known. A drill string 225 is suspended within a borehole 236 and has a bottom hole assembly (BHA) 240 which includes a drill bit 246 at its lower end. A surface system 220 includes platform and derrick assembly positioned over the borehole 236, the assembly including a rotary table 224, kelly (not shown), hook 221, and rotary swivel 222. The drill string 225 is rotated by the rotary table 224 energized by means not shown, which engages the kelly (not shown) at the upper end of the drill string 225. The drill string 225 is suspended from the hook 221, attached to a traveling block (also not shown), through the kelly (not shown) and the rotary swivel 222 which permits rotation of the drill string 225 relative to the hook 221. As is well known, a top drive system could be used instead of the rotary table system shown in FIG. 1.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid to flow downwardly through the drill string 225 as indicated by the directional arrow 234. The drilling fluid exits the drill string via ports (not shown) in the drill bit 246, and then circulates upwardly through an annulus region 235 between the outside of the drill string 225 and the wall of the borehole 236, as indicated by the directional arrows 235 and 235A. In this manner, the drilling fluid lubricates the drill bit 246 and carries formation cuttings up to the surface as it is returned to the pit 231 for recirculation.

The BHA 240 of the illustrated embodiment may include a measuring-while-drilling (MWD) tool 241, a logging-while-drilling (LWD) tool 244, a rotary steerable directional drilling system 245 and motor, and the drill bit 246. It will also be understood that more than one LWD tool and/or MWD tool can be employed, e.g. as represented at 243.

The LWD tool 244 is housed in a special type of drill collar, as is known in the art, and can contain one or a plurality of known types of logging tools. The LWD tool 244 may include capabilities for measuring, processing, and storing information, as well as for communicating with the surface equipment. In the present example, the LWD tool 244 may be any one or more well logging instruments known in the art, including, without limitation, electrical resistivity, acoustic velocity or slowness, neutron porosity, gamma-gamma density, neutron activation spectroscopy, nuclear magnetic resonance and natural gamma emission spectroscopy.

The MWD tool 241 is also housed in a special type of drill collar, as is known in the art, and can contain one or more devices for measuring characteristics of the drill string and drill bit. The MWD tool 241 further includes an apparatus 242 for generating electrical power to the downhole system. This may include a mud turbine generator powered by the flow of the drilling fluid, it being understood that other power and/or battery systems may be employed. In the present embodiment, the MWD tool 241 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 242 may also include a drilling fluid flow modulator for communicating measurement and/or tool condition signals to the surface for detection and interpretation by a logging and control unit (e.g., a "controller") 226.

Figure 2A:
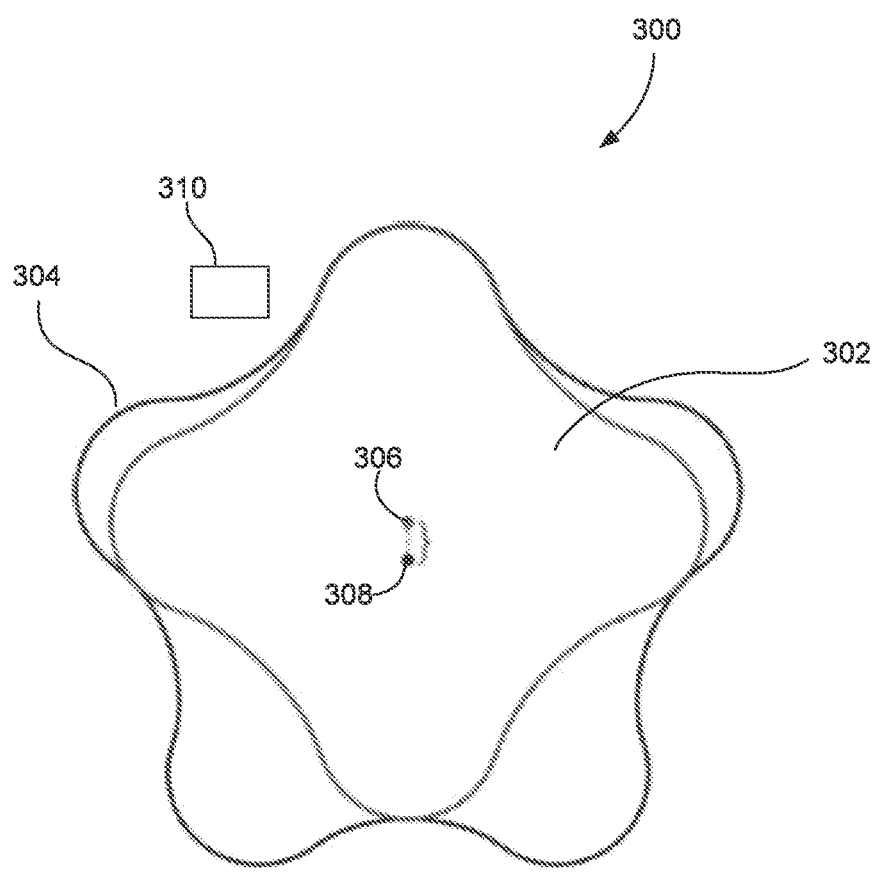
FIG. 2A illustrates an end view of a mud motor, according to an embodiment.

FIG. 2A illustrates a profile of a rotor 302 and a stator 304 of a mud motor 300 (e.g., part of the system 245 of FIG. 1), specifically viewing a highly simplified version of the inlet (uphold side) or outlet (downhole side) thereof, according to an embodiment. As shown, the mud motor may be a Moineau, progressive-cavity motor, and thus the rotor 302 and the stator 304 may each include lobes. The stator 304 may be made of rubber, and the rotor/stator combination may be housed in a metal tube.

The rotor 302 rotates eccentrically with respect to the stator 304. That is, a center 306 of the rotor 302 may orbit a center 308 of the shaft 310 as the rotor 302 rotates. Such eccentricity, defined as the distance between the centers 306, 308, may not be constant throughout the length of the mud motor 300. Eccentricity may be measured using a magnetic sensor 310 (e.g., one or more magnets) which may be embedded in the stator 304 and/or in the rotor 302, proximal to the inlet, the outlet, or anywhere else in the mud motor that may be convenient. According to the concepts presented herein, the measured eccentricity, e.g., at the inlet or the outlet, may be employed to determine torque. In some cases, this may allow for detection and avoidance of an imminent stall and/or other performance attributes of the mud motor 300.

In at least one embodiment, the controller 226 (FIG. 1) may be in communication with the magnetic sensor 310, such that the controller 226 is configured to receive signals generated by the magnetic sensor 310. The signals may represent (either directly, or indirectly by allowing determination of) the eccentricity of the rotation of the rotor 302 with respect to the stator 304. The controller 226 may also be in communication with the pump 233 and may change operation (e.g., speed, pressure, flowrate, etc.) of the pump 233 at least partially in response to the eccentricity measurements.

Figure 2B:
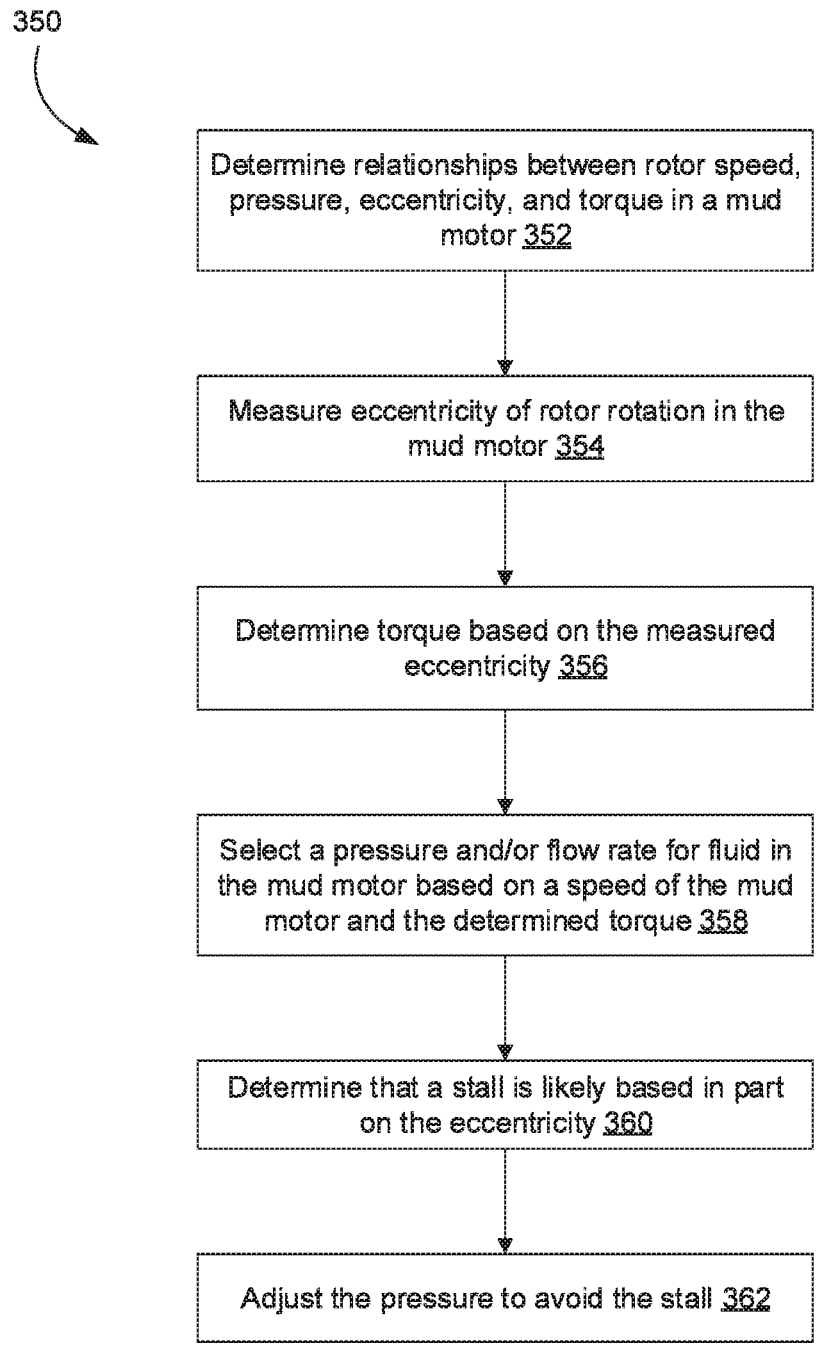
FIG. 2B illustrates a flowchart of a method, according to an embodiment.

FIG. 2B illustrates a simplified flowchart of a method 350 for controlling a mud motor based in part on eccentricity of rotation of the rotor thereof, according to an embodiment. The method 350 may include determining relationships between the rotor 302 speed, pressure (e.g., at the pump 233) of fluid in the mud motor 300, eccentricity of the rotor 302 rotation, and torque in the mud motor 300, as at 352. The relationships may be determined prior to deploying the mud motor 300 into a wellbore, e.g., in a test laboratory, or via computer simulations of digital models of the mud motor and operating conditions thereof. In another embodiment, the relationships may be determined empirically, e.g., in the field.

Figure 3:
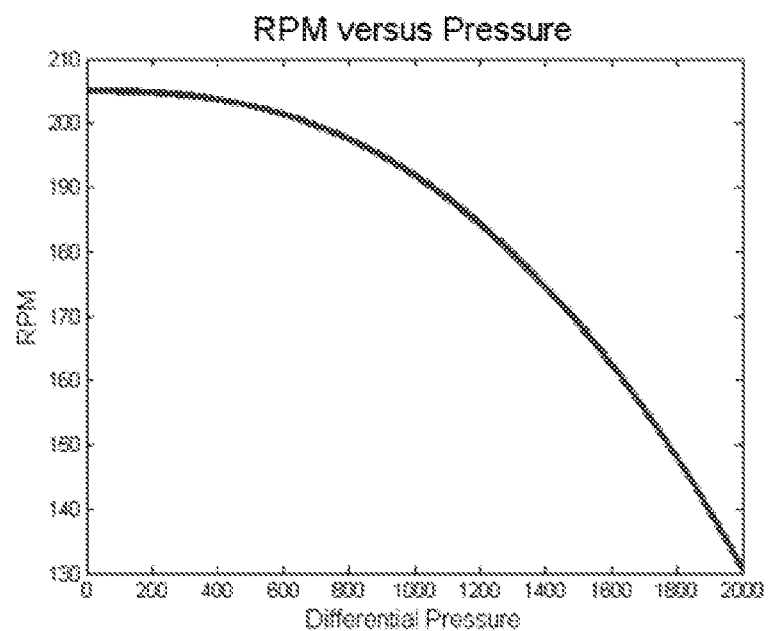
FIGS. 3 and 4 illustrate plots of RPM versus pressure and torque, respectively, according to an embodiment.
Figure 4:
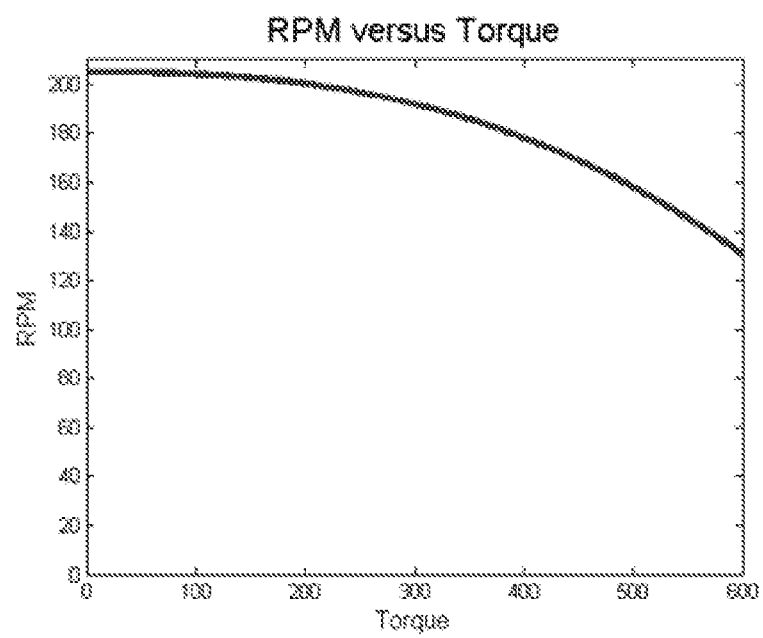

FIGS. 3 and 4 illustrate plots of rotational speed (RPM) of the rotor 302 versus differential pressure and torque, respectively, according to an example at a certain pump 233 pressure. Differential pressure (pressure drop between the inlet and outlet of the mud motor 300) and torque may be difficult to measure directly, and thus the relationships developed herein may allow for derivation of either or both thereof based on the eccentricity measurement. In particular, FIGS. 3 and 4 show that the rotational speed reduces at high differential pressures and torques.

Figure 5:
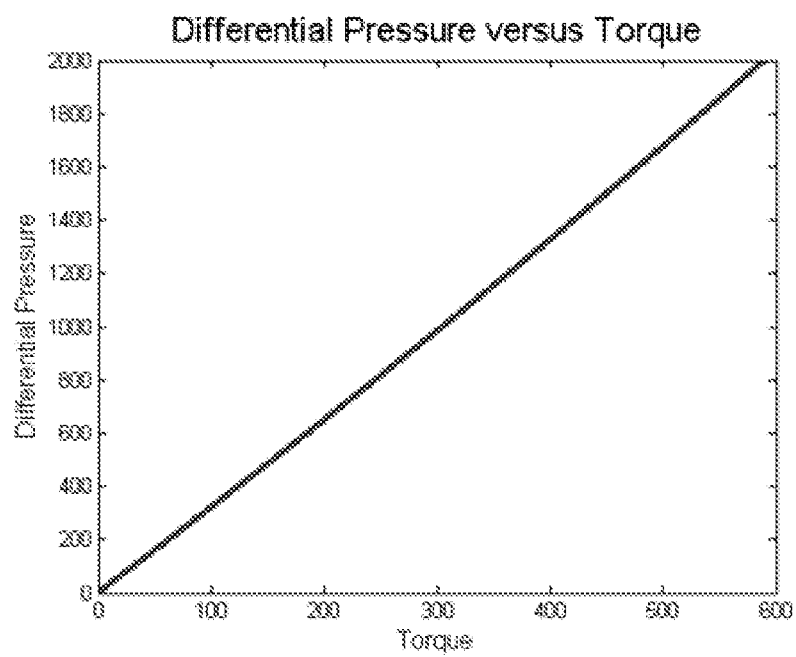
FIGS. 5 and 6 illustrate plots of differential pressure versus torque, and torque versus pressure, respectively, according to an embodiment.
Figure 6:
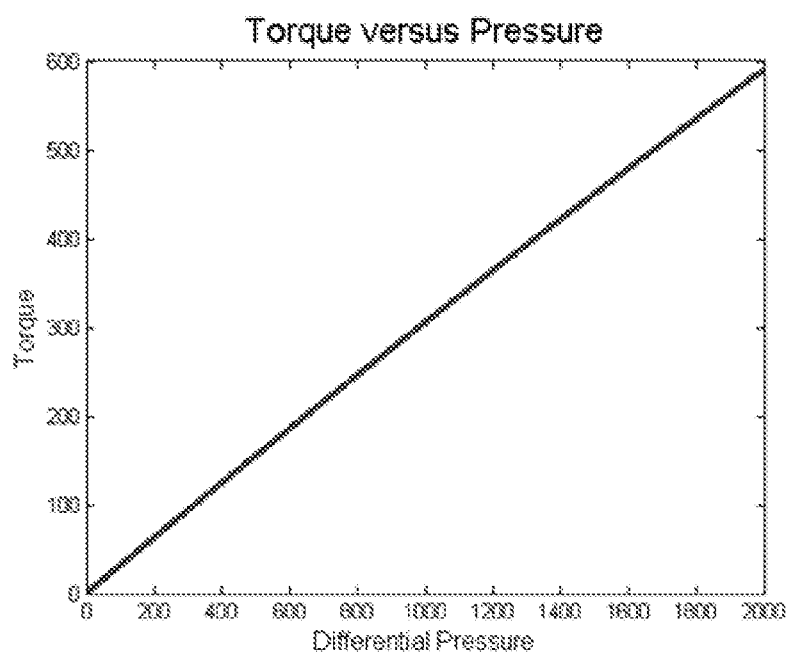

FIGS. 5 and 6 illustrate plots of differential pressure versus torque and torque versus differential pressure, respectively, showing a nearly linear relationship, according to an example at a certain pump 233 pressure. For example, the relationship between pressure and torque may be linear and increasing, such that increased torque yields a proportionally-increased differential pressure, and increased pressure yields a proportionally-increased torque, as shown in FIGS. 5 and 6.

Figure 7:
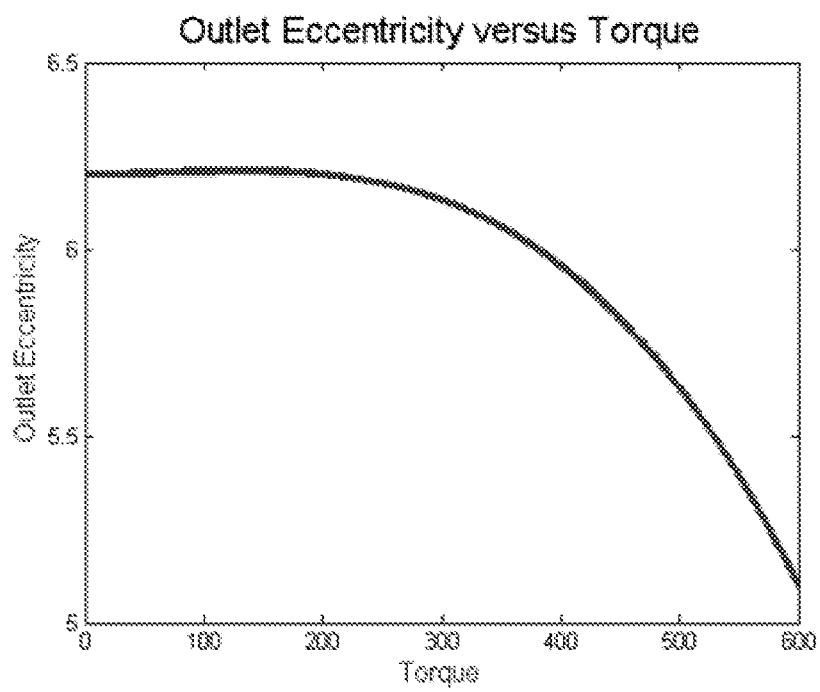
FIGS. 7 and 8 illustrate plots of outlet eccentricity versus torque and differential pressure, respectively, according to an embodiment.
Figure 8:
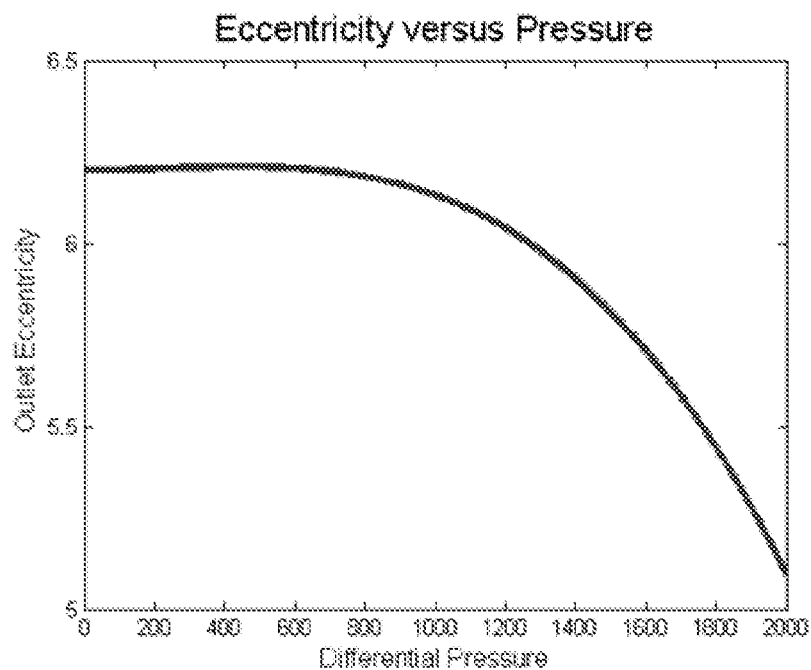

FIGS. 7 and 8 illustrate plots of outlet eccentricity versus torque and outlet eccentricity versus differential pressure, respectively, according to an example. As shown, eccentricity decreases as torque and differential pressure increase, similar to rotational speed. As such, eccentricity measurements at the outlet can be used to calculate torque and differential pressure, as disclosed herein. In turn, the calculations of torque and differential pressure may be employed to determine rotor speed, according to the plots shown in FIGS. 3 and 4. It will be appreciated that the relationships shown in FIGS. 3-8 may change as between different mud motors, and as between different pressures at the pump 233.

Figure 9:
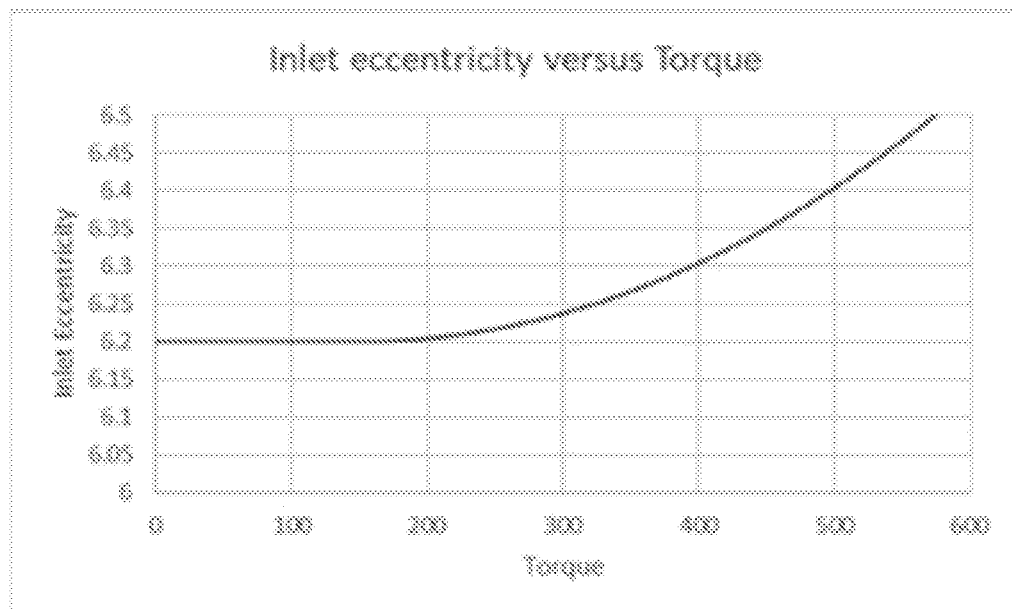
FIGS. 9 and 10 illustrate plots of inlet eccentricity versus torque and differential pressure, respectively, according to an embodiment.
Figure 10:
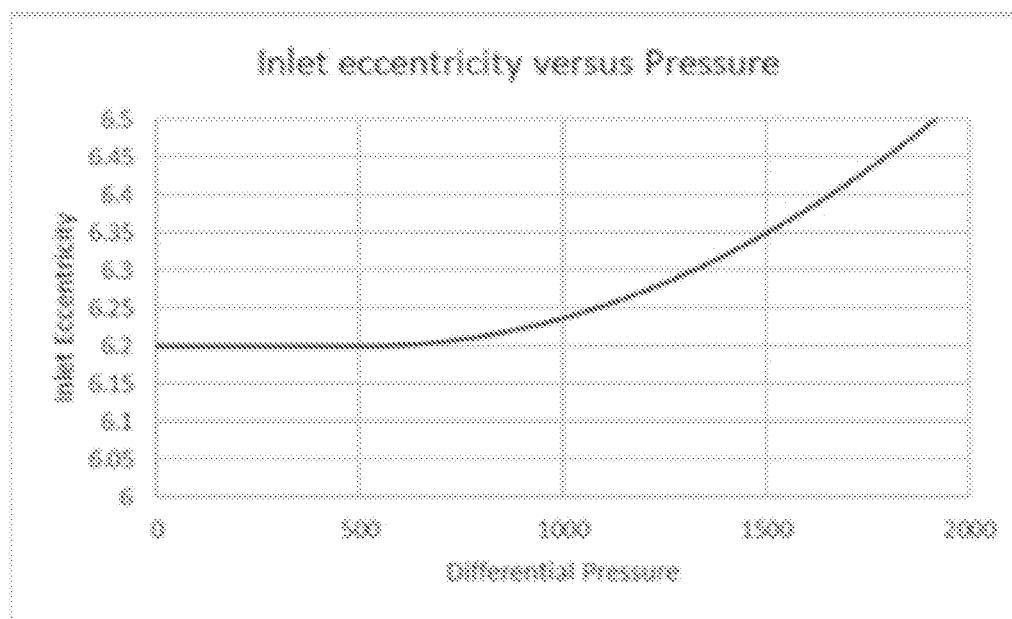

FIGS. 9 and 10 illustrate inlet eccentricity versus torque and inlet eccentricity versus differential pressure, respectively, according to an example. As shown, the eccentricity may increase as differential pressure and torque increase. Further, as can be appreciated from the range of eccentricity measurements, the eccentricity at the inlet may change by a smaller amount over the same change of differential pressure and torque than the eccentricity at the outlet (as shown in FIGS. 7 and 8). Accordingly, sensors positioned at or near to the inlet may have a greater sensitivity to the position of the rotor 302 in order to capture this change. However, positioning a sensors at the inlet may, in some embodiments, be more convenient than positioning the sensor proximal to the outlet, despite the heightened sensitivity. The calculations of rotor speed, etc. may be developed similarly to those discussed above with respect to outlet eccentricity.

Figure 11:
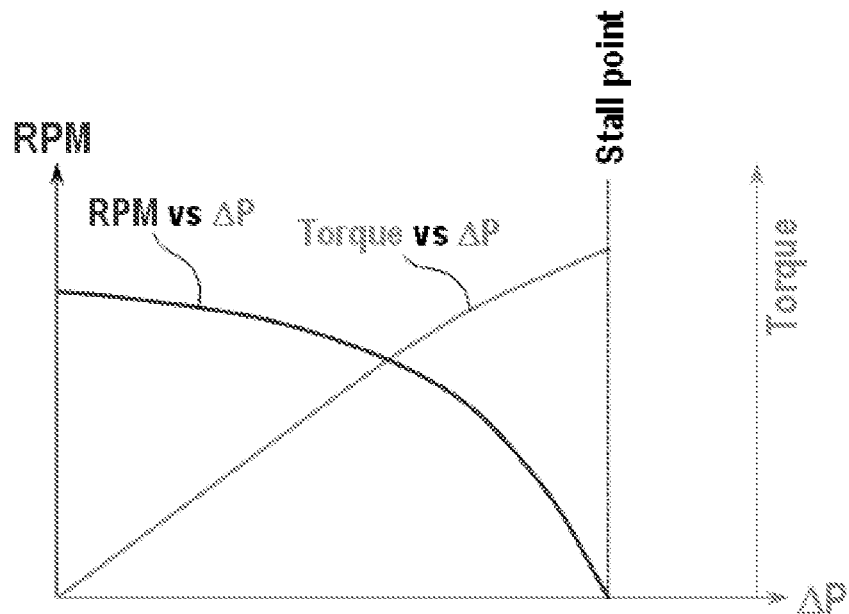
FIGS. 11 and 12 illustrate curves for RPM versus pressure, torque versus differential pressure, and RPM versus torque, respectively, according to an embodiment.

FIG. 11 illustrates relationships between rotational speed and differential pressure, and torque and differential pressure, respectively, with a stall point indicated. Thus a measurement of eccentricity may allow for calculation of the torque and/or differential pressure, which may then be used to calculate rotational speed.

Figure 12:
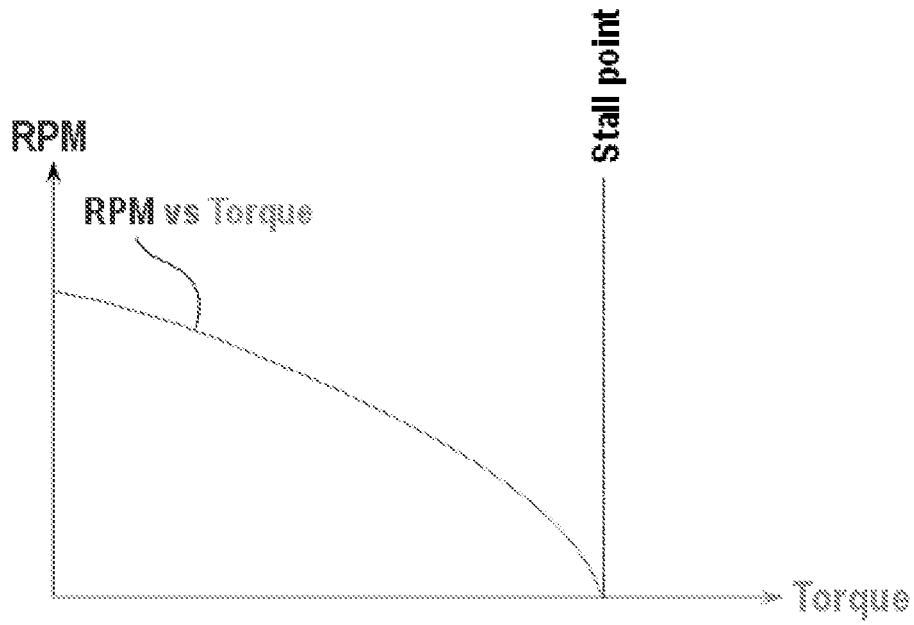

More particularly, the combination of these relationships can establish or at least predict stall points. For example, as shown in FIG. 11, the differential pressure can be related to the speed, and thus when the speed drops to zero, there is a stall point. Similarly, the torque at this point can be established as a function of differential pressure. In FIG. 12, the speed versus the torque relationship is shown. Thus, if the eccentricity is known, the speed may be known based on the relationship in FIG. 12, and the stall point (where speed drops to zero) may be predicted based on torque, which in turn is determined based on eccentricity.

Referring again to FIG. 2B, the method 350 may proceed to measuring an eccentricity in the rotor 302 rotation in the mud motor 300, as at 354. In some embodiments, this eccentricity may be measured using the magnetic sensor 310 that tracks rotor position. Such sensor 310 may also measure the speed of the rotation of the rotor 302 with respect to the stator 304, as noted above.

The method 350 may also include determining torque in the mud motor 300, as at 356, based on the eccentricity measured at 354 and the relationship(s) determined at 352. As discussed above, the determination of the relationships at 352 enables the eccentricity measurements to be converted to torque and/or differential pressure at a given pressure/flow rate at the pump 233.

The method 350 may then proceed to selecting a pressure and/or flow rate for fluid in the mud motor 300 based in part on the torque determined, as at 358. This may be established according to a power/speed curve, whereby the torque is included in the power calculation. A single mud motor may have several power/speed curves, e.g., depending on flow-rate/pressure of the fluid provided by the pump 233. Further, the selected pressure may be provided by modulating the speed of the pump 233 at the surface.

As noted above with respect to FIGS. 11 and 12, there may be a relationship between eccentricity of rotation and an impeding stall. In some situations, the eccentricity may decrease linearly as pressure increases, until reaching a certain level, where the eccentricity may become generally constant. This may be indicative that pressure is about to throttle, resulting in a stall. Accordingly, the method 350 may include determining that a stall is likely based on the eccentricity (e.g., in combination with the pressure), as at 360. If a stall is likely, the pressure may be adjusted in the mud motor 300, as at 362, e.g., by changing the flowrate through pump(s) 233 supplying the fluid (e.g., drilling mud) to the mud motor.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 13:
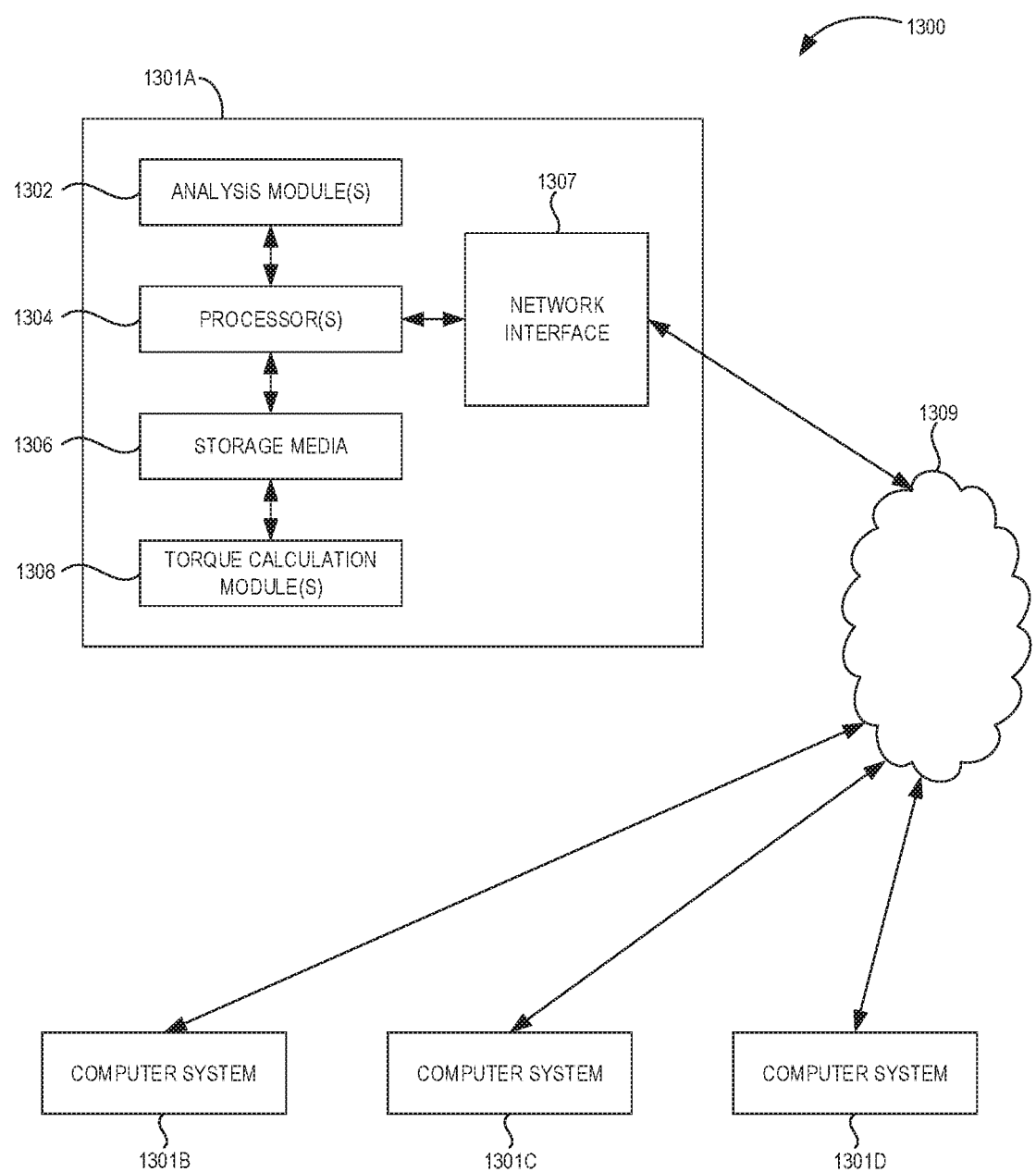
FIG. 13 illustrates a schematic view of a computing system, according to an embodiment.

In some embodiments, any of the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis module(s) 1302 configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor can include a microprocessor, microcontroller, processor module or subsystem, programmable integrated circuit, programmable gate array, or another control or computing device.

The storage media 1306 can be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1300 contains one or more torque calculation module(s) 1308. In the example of computing system 1300, computer system 1301A includes the torque calculation module 1308. In some embodiments, a single torque calculation module may be used to perform some or all aspects of one or more embodiments of the methods. In alternate embodiments, a plurality of torque calculation modules may be used to perform some or all aspects of methods.

It should be appreciated that computing system 1300 is only one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Controls, models and/or other interpretation aids may be refined in an iterative fashion; this concept is applicable to embodiments of the present methods discussed herein. This can include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
   measuring an eccentricity of rotation of a rotor in a stator of a mud motor using a rotor- position sensor;
   determining a torque of the mud motor based in part on the eccentricity; and
   adjusting operation of a pump configured to deliver fluid downhole to the mud motor, based in part on the determined torque, wherein adjusting operation of the pump comprises adjusting a pressure of the fluid at the pump, a fluid flow rate at the pump, or both.

2. The method of claim 1, wherein the eccentricity is measured proximal to an outlet of the mud motor or at an inlet of the mud motor, or both.

3. The method of claim 1, further comprising:
   measuring the eccentricity during an operation of the mud motor; and
   determining that a stall is likely based in part on the eccentricity.

4. The method of claim 3, further comprising, in response to determining that the stall is likely, adjusting the fluid flow rate downhole to avoid the stall.

5. The method of claim 3, wherein determining that the stall is likely comprises determining that the eccentricity does not substantially decrease in response to a rise in differential pressure.

6. The method of claim 1, wherein determining the torque comprises:
   determining a relationship between the eccentricity of the rotation of the rotor in the stator and a differential pressure across the mud motor;
   determining a relationship between the eccentricity and the torque; and
   determining a relationship between the differential pressure and the torque.

7. The method of claim 6, wherein the relationship between the eccentricity and torque is determined empirically or using a model.

8. The method of claim 1, wherein the rotor-position sensor comprises a magnetic sensor, and wherein measuring the eccentricity comprises tracking a position of the rotor with respect to the stator using the magnetic sensor.

9. The method of claim 8, further comprising:
measuring a speed of the rotor using the magnetic sensor; and
determining that a stall is likely based on a combination of the speed of the rotor and the torque.

10. A system, comprising:
a mud motor having a rotor, a stator, and a rotor-position sensor, wherein the rotor is configured to rotate eccentrically with respect to the stator, and wherein the rotor-position sensor is configured to measure an eccentricity of the rotation of the rotor with respect to the stator;
a pump configured to deliver fluid to the mud motor, wherein the fluid delivered to the mud motor causes the rotor to rotate; and
a controller in communication with the pump and the rotor-position sensor, wherein the controller is configured to receive measurements representing the eccentricity from the rotor-position sensor, and wherein the controller is configured to determine a torque of the mud motor based on the eccentricity.

11. The system of claim 10, wherein the controller is configured to adjust an operation of the pump in response to the torque.

12. The system of claim 10, wherein the controller is configured to determine a speed of the rotation of the rotor, a differential pressure across the rotor, or a combination thereof based in part on the torque.

13. The system of claim 10, wherein the controller is configured to determine that a stall in the rotor is likely based in part on the torque.

14. The system of claim 13, wherein the controller is configured to adjust a flowrate or speed of the pump to avoid the stall.

15. The system of claim 10, wherein the rotor-position sensor is located proximal to a fluid inlet of the mud motor.

16. The system of claim 10, wherein the rotor-position sensor is located proximal to a fluid outlet of the mud motor.

17. A non-transitory, computer-readable medium storing instructions that, when executed by a process of a computing system, cause the computing system to perform operations, the operations comprising:
determining an eccentricity of rotation of a rotor in a stator of a mud motor based on measurements received from a rotor-position sensor;
determining a torque of the mud motor based on the eccentricity; and
adjusting operation of a pump configured to deliver fluid downhole to the mud motor, based on the determined torque, wherein adjusting operation of the pump comprises adjusting a pressure of the fluid at the pump, a fluid flow rate at the pump, or both.

18. The medium of claim 17, wherein the eccentricity is measured at an outlet of the mud motor or at an inlet of the mud motor, or both at the inlet and the outlet.

19. The medium of claim 17, wherein the operations further comprise:
measuring the eccentricity during an operation of the mud motor;
determining that a stall is likely based in part on the eccentricity; and
in response to determining that the stall is likely, adjusting the fluid flow rate and/or pressure downhole to avoid the stall.

20. The medium of claim 19, wherein determining that the stall is likely comprises determining that the eccentricity does not substantially decrease in response to a rise in differential pressure.

* * * * *